US009794964B2

(12) United States Patent
Hahm et al.

(10) Patent No.: US 9,794,964 B2
(45) Date of Patent: Oct. 17, 2017

(54) METHOD AND APPARATUS FOR CONNECTING WIRELESS NETWORK IN A DIGITAL DEVICE

(71) Applicant: Samsung Electronics Co., Ltd., Gyeonggi-do (KR)

(72) Inventors: Seong-Il Hahm, Gyeonggi-do (KR); Woo-Jin Park, Gyeonggi-do (KR); Woo-Shik Kang, Gyeonggi-do (KR); Seung-Seop Shim, Gyeonggi-do (KR); Jin-Wook Lee, Gyeonggi-do (KR); Eung-Sik Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 14/861,975

(22) Filed: Sep. 22, 2015

(65) Prior Publication Data
US 2016/0014823 A1 Jan. 14, 2016

Related U.S. Application Data

(63) Continuation of application No. 13/288,752, filed on Nov. 3, 2011, now Pat. No. 9,144,093.

(30) Foreign Application Priority Data

Nov. 3, 2010 (KR) .......................... 10-2010-0108505

(51) Int. Cl.
*H04W 76/02* (2009.01)
*H04B 17/318* (2015.01)
(Continued)

(52) U.S. Cl.
CPC .......... *H04W 76/02* (2013.01); *H04B 17/318* (2015.01); *H04L 41/0806* (2013.01);
(Continued)

(58) Field of Classification Search
CPC ....... H04W 4/02; H04W 4/021; H04W 4/022; H04W 4/023; H04W 4/025; H04W 4/026;
(Continued)

(56) References Cited

U.S. PATENT DOCUMENTS 7,142,846 B1 11/2006 Henderson
7,171,242 B2 1/2007 Kobayashi et al.
(Continued)

FOREIGN PATENT DOCUMENTS

CN  101149449 A  3/2008
CN  101179749 A  5/2008
(Continued)

OTHER PUBLICATIONS

Extended European Search Report dated Jul. 18, 2015 in connection with European Application No. 11838251.4, 9 pages.
(Continued)

*Primary Examiner* — Robert M Morlan

(57) ABSTRACT

A method and an apparatus for automatically connecting a wireless Local Area Network (LAN) between digital devices and executing an application program based on the wireless LAN, and more particularly, an apparatus and a method for generating device information indicating attributes in a digital device and obtaining attributes of a peripheral device by analyzing device information of the peripheral device. The apparatus includes a device information generation part configured to generate device information including information about attributes by analyzing the attributes of the digital device. The apparatus also includes a device recognition part configured, when receiving device information of a peripheral device, to obtain attribute information of a device corresponding to the received device information. The apparatus further includes a controller configured to
(Continued)

control to transmit the device information generated by the device information generation part, to the peripheral device.

20 Claims, 10 Drawing Sheets

(51) Int. Cl.
  *H04L 12/24* (2006.01)
  *H04L 29/08* (2006.01)
  *H04W 84/12* (2009.01)
(52) U.S. Cl.
  CPC ........ *H04L 41/5058* (2013.01); *H04L 67/303* (2013.01); *H04W 84/12* (2013.01)
(58) Field of Classification Search
  CPC ....... H04W 4/027; H04W 4/028; H04W 4/04; H04W 4/043; H04W 4/046; H04W 84/18; H04W 88/02; H04W 88/021; H04W 88/022; H04W 88/023
  See application file for complete search history.

(56) References Cited

U.S. PATENT DOCUMENTS

| | | | | |
|---|---|---|---|---|
| 7,174,238 | B1* | 2/2007 | Zweig | H04L 67/025 700/245 |
| 7,192,359 | B1 | 3/2007 | Lundgren et al. | |
| 7,251,318 | B1 | 7/2007 | Henderson | |
| 7,865,601 | B2 | 1/2011 | Yamamoto et al. | |
| 8,065,519 | B2 | 11/2011 | Suzuki | |
| 8,116,223 | B2 | 2/2012 | Tian et al. | |
| 8,131,847 | B2 | 3/2012 | Kalbag | |
| 8,174,613 | B2 | 5/2012 | Nakamura | |
| 8,174,998 | B2 | 5/2012 | Ebata et al. | |
| 8,184,613 | B2 | 5/2012 | Patel et al. | |
| 8,559,350 | B2* | 10/2013 | Kuehnel | H04W 8/005 370/312 |
| 8,599,350 | B2 | 12/2013 | Park et al. | |
| 8,599,805 | B2 | 12/2013 | Endo et al. | |
| 8,781,397 | B2 | 7/2014 | Sole | |
| 2006/0023677 | A1 | 2/2006 | Labrador et al. | |
| 2006/0223556 | A1* | 10/2006 | Xu | H04L 67/18 455/502 |
| 2007/0036359 | A1 | 2/2007 | Suzuki | |
| 2007/0041426 | A1* | 2/2007 | Hashimoto | H04B 1/7163 375/130 |
| 2007/0141988 | A1 | 6/2007 | Kuehnel et al. | |
| 2009/0271709 | A1 | 10/2009 | Jin et al. | |
| 2010/0020186 | A1 | 1/2010 | Matsui | |
| 2010/0195539 | A1 | 8/2010 | Tian et al. | |
| 2010/0235460 | A1 | 9/2010 | Mochizuki et al. | |
| 2010/0265894 | A1 | 10/2010 | Ebata et al. | |
| 2010/0297939 | A1* | 11/2010 | Fujita | H04W 4/00 455/41.1 |
| 2011/0063663 | A1 | 3/2011 | Kim et al. | |
| 2011/0148752 | A1* | 6/2011 | Alameh | G06F 1/1694 345/156 |
| 2011/0243116 | A1 | 10/2011 | Endo et al. | |
| 2012/0050568 | A1 | 3/2012 | Tsujii | |
| 2012/0246711 | A1 | 9/2012 | Patel et al. | |

FOREIGN PATENT DOCUMENTS

| | | |
|---|---|---|
| CN | 101807915 A | 8/2010 |
| CN | 101807945 A | 8/2010 |
| CN | 101834766 A | 9/2010 |
| JP | 2006197122 A | 7/2006 |
| JP | 2009537898 A | 10/2009 |
| JP | 2009260783 A | 11/2009 |
| JP | 2010028171 A | 2/2010 |
| JP | 2010119028 A | 5/2010 |
| JP | 2010141724 A | 6/2010 |

OTHER PUBLICATIONS

Notice of Preliminary Rejection dated Jul. 29, 2016 in connection with Korean Application No. 10-2010-0108505, 8 pages.
Foreign Communication From a Related Counterpart Application, Korean Application No. 10-2010-0108505, Notice of Patent Grant dated Dec. 26, 2016, 4 pages.
International Search Report dated Mar. 16, 2012 in connection with International Application No. PCT/KR2011/008333; 3 pages.
Written Opinion of the International Searching Authority dated Mar. 16, 2012 in connection with International Application No. PCT/KR2011/008333; 3 pages.
Patent Examination Report No. 1 dated Dec. 15, 2014 in connection with Australian Patent Application No. 2011324229; 3 pages.
First Office Action dated Apr. 28, 2015 in connection with Chinese Patent Application No. 201180053080.1; 20 pages.
Notice of Preliminary Rejection dated Sep. 7, 2015 in connection with Japanese Patent Application No. 2013-537609; 13 pages.
Foreign Communication From a Related Counterpart Application, European Application No. 11838251.4, Communication pursuant to Article 94(3) EPC, dated Apr. 20, 2017, 7 pages.

* cited by examiner

METHOD AND APPARATUS FOR CONNECTING WIRELESS NETWORK IN A DIGITAL DEVICE

CROSS-REFERENCE TO RELATED APPLICATION AND CLAIM OF PRIORITY

The present application is a continuation of U.S. patent application Ser. No. 13/288,752, filed on Nov. 3, 2011, entitled "METHOD AND APPARATUS FOR CONNECTING WIRELESS NETWORK IN A DIGITAL DEVICE, which claims benefit under 35 U.S.C. §119(a) to a Korean patent application filed in the Korean Intellectual Property Office on Nov. 3, 2010, and assigned Serial No. 10-2010-0108505. Each of these documents are incorporated by reference into the present disclosure as if fully set forth herein.

TECHNICAL FIELD

The present disclosure relates generally to a method and an apparatus for automatically connecting a wireless Local Area Network (LAN) between digital devices and for executing an application program based on the wireless LAN. More particularly, the present disclosure relates to an apparatus and a method for generating device information indicating attributes in a digital device and obtaining attributes of a peripheral device by analyzing device information of the peripheral device.

BACKGROUND

Based on the advance of wireless technology, research is being conducted to support wireless Local Area Network (LAN) connection in a digital device such as a notebook computer and Personal Digital Assistant (PDA). For example, Institute of Electrical and Electronics Engineers (IEEE) 802.11, Wi-Fi Alliance (WFA) Wi-Fi Protected Setup (WPS), and WFA Wi-Fi direct standards are working on a wireless LAN communication scheme of a digital device. A conventional wireless LAN communication method can be divided into an infrastructure mode where a digital device operating as a station communicates by connecting to a digital device acting as an access point, and an ad hoc mode where a plurality of digital devices acting as the stations are directly connected.

The IEEE 802.11 standard supports both of the infrastructure mode and the ad hoc mode. In the infrastructure mode and the ad hoc mode of the IEEE 802.11 standard, when one digital device sets a Service Set IDentifier (SSID), security key, and Internet Protocol (IP) address allocation scheme, the other digital device inputs the security key by searching the SSID and sets an IP address according to the set IP address allocation scheme. Thus, the digital devices are connected over the wireless LAN.

The WFA WPS standard supports the infrastructure mode, and the WFA Wi-Fi direct standard supports the ad hoc mode. Herein, in the infrastructure mode of the WFA. WPS standard and the ad hoc mode of the WFA Wi-Fi direct standard, when a Push Button Configuration (PBC) button is clicked in digital devices to connect or a Personal Identification Number (PIN) is generated in one digital device, the other digital device inputs the PIN, thus achieving the wireless LAN connection.

In the conventional wireless LAN connection method as discussed above, for the wireless LAN connection, a user needs to directly set and input the necessary information for the wireless LAN connection (e.g., the SSID, the security key, the IP address, and the PIN) in the digital device. However, prior knowledge about the wireless LAN is often required to directly set and input the necessary information for the wireless LAN connection, and accordingly it is difficult for many users to adopt this method.

To address this drawback, a technique (described in Korean Patent Application Serial No. 10-2010-0075504 to Samsung Electronics) for automatically exchanging the random PIN when two wireless LAN devices approach and connecting using the WPS PIN when the PIN exchange is successful is suggested to automatically connect the wireless LAN upon approaching the device to the intended device to connect.

However, as such a technique cannot acquire detailed information about the nearby device, the user cannot search for his/her intended peripheral device alone.

SUMMARY

To address the above-discussed deficiencies of the prior art, it is an aspect of the present disclosure to provide an apparatus and a method for generating device information of a digital device in the digital device.

Another aspect of the present disclosure is to provide an apparatus and a method for acquiring attributes of a peripheral device by receiving device information in a digital device.

Another aspect of the present disclosure is to provide an apparatus and a method for changing configuration of a peripheral device using device information in a digital device.

Yet another aspect of the present disclosure is to provide a method and an apparatus for transmitting device information using a management frame for wireless LAN connection in a digital device.

In accordance with an aspect of the present disclosure, an apparatus for connecting a wireless network in a digital device is provided. The apparatus includes a device information generation part configured to generate device information including information about attributes by analyzing the attributes of the digital device. The apparatus also includes a device recognition part configured, when receiving device information of a peripheral device, to obtain attribute information of a device corresponding to the received device information. The apparatus further includes a controller configured to control to transmit the device information generated by the device information generation part to the peripheral device.

In accordance with another aspect of the present disclosure, a method for connecting a wireless network in a digital device is provided. The method includes generating device information including information about attributes by analyzing the attributes of the digital device, and transmitting the device information to a peripheral device. The method also includes, when receiving device information of the peripheral device, obtaining attribute information of a device corresponding to the received device information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure.

Exemplary embodiments of the present disclosure provide an apparatus and a method for generating device information indicating attributes of a digital device and obtaining attributes of a peripheral device using the device information in the digital device.

Figure 1:
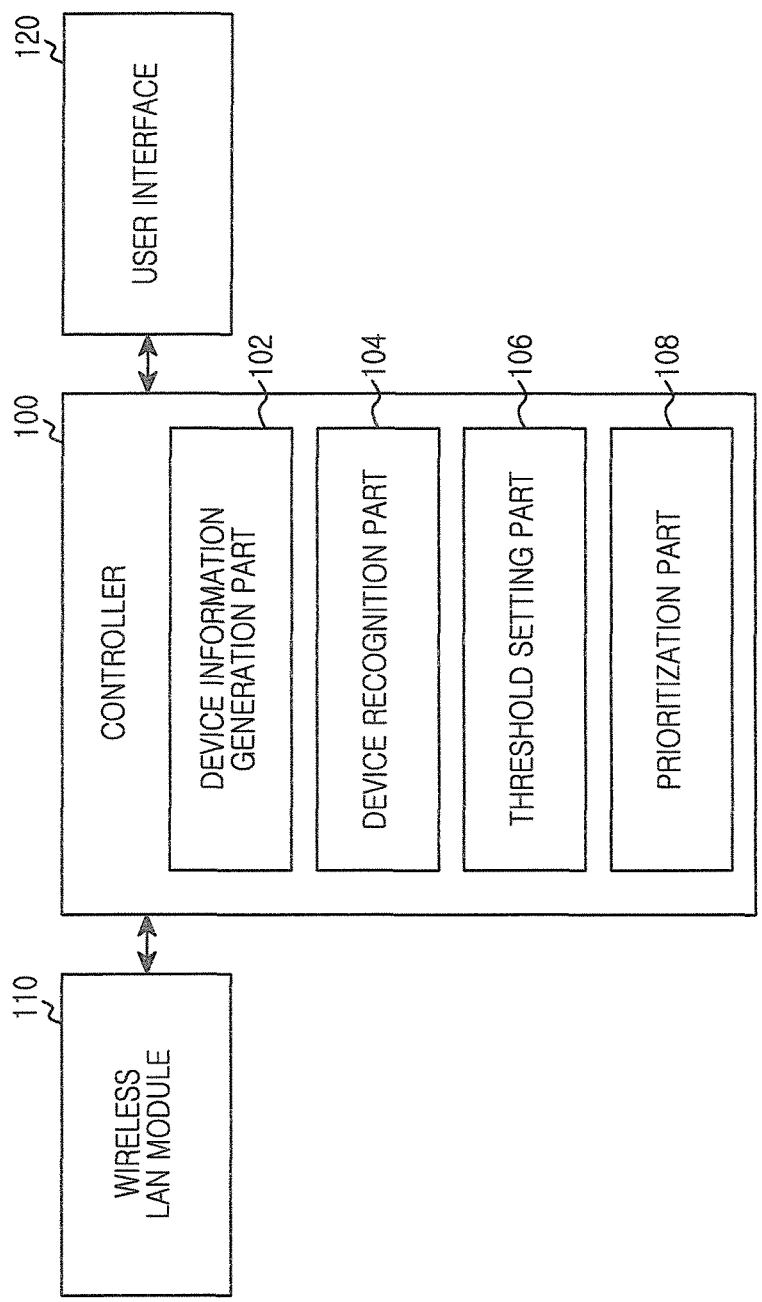
FIG. 1 illustrates a block diagram of a digital device for generating device information and acquiring attributes of a peripheral device using the device information according to an embodiment of the present disclosure.

FIG. 1 illustrates a block diagram of a digital device for generating device information and acquiring attributes of a peripheral device using the device information according to an embodiment of the present disclosure.

Referring to FIG. 1, the digital device includes a controller 100, a wireless Local Area Network (LAN) module 110, and a user interface 120. The controller 100 includes a device information generation part 102, a device recognition part 104, a threshold setting part 106, and a prioritization part 108.

The controller 100 controls and processes operations of the digital device, and generates information associated with the wireless LAN connection, information associated with executing an application program, and a management frame including various information associated with the wireless LAN connection, which are disclosed in Korean Patent Application Serial No. 10-2010-0075504, the contents of which are hereby incorporated by reference.

In addition, the controller 100 including the device information generation part 102, the device recognition part 104, the threshold setting part 106, and the prioritization part 108, controls and processes to generate device information of the digital device.

Figure 2:
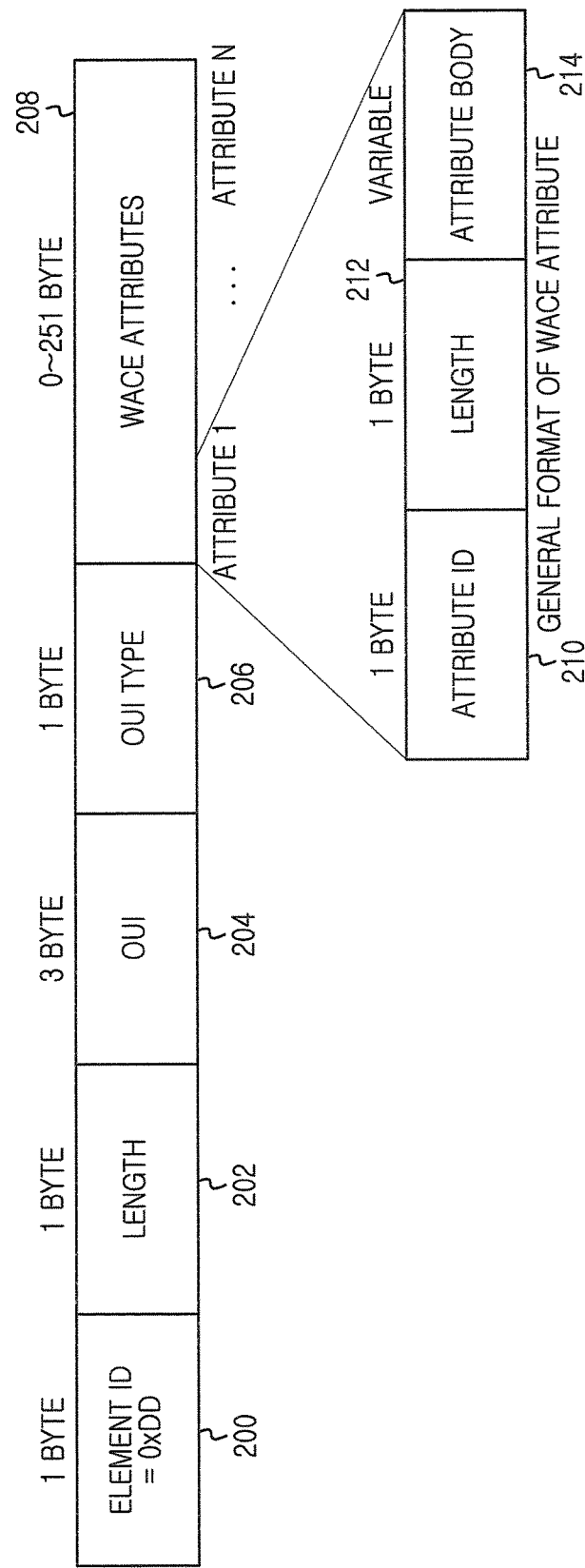
FIG. 2 illustrates a diagram of a management frame including the device information in the digital device according to an embodiment of the present disclosure.

In more detail, the controller 100 generates the device information of the digital device. When receiving device information from a peripheral device, the controller 100 processes to analyze attribute information of the peripheral device. The controller 100 includes the generated device information to the management frame including a beacon frame, a probe request frame, and a probe response frame, and sends the management frame to the peripheral digital device. The management frames can be constructed as shown in FIG. 2.

The device information generation part 102 analyzes the attribute information such as type, year of production, device model of the digital device, and generates the device information including the analyzed information.

When receiving the device information from the peripheral device, the device recognition part 104 analyzes and stores the attribute information of the peripheral device in the received information, and recognizes nearby digital devices using the analyzed attribute information.

The threshold setting part 106 changes a threshold used to recognize the nearby digital device using the attribute information analyzed by the device recognition part 104. The threshold is changed to address inaccurate determination according to the characteristics of the peripheral device when the controller 100 detects a receive signal over the threshold and determines that the counterpart digital device is in proximity. For example, when a peripheral device that includes an external antenna is weaker than a peripheral device that includes an embedded antenna in a transmit signal strength and the same threshold is applied to the two peripheral devices, it is infeasible to determine the proximity of the peripheral device that includes the embedded antenna. Thus, the threshold for the peripheral device that includes the embedded antenna is changed. The threshold change for determining the proximity of the peripheral device shall be explained in FIG. 10.

The prioritization part 108 changes priority of devices communicating with the digital device to provide a differentiated service to each peripheral device. For example, when communicating with the peripheral devices using voice service, video service, and best effort service, the prioritization part 108 prioritizes the peripheral device using the voice service of high priority by use of the device information and thus regulates a Contention Window (CW) and an Arbitration InterFrame Space (AIFS).

Alternatively, the prioritization part 108 can prioritize the peripheral device communicating with a plurality of devices by determining the number of the communicating devices per peripheral device using the device information.

For example, when a TV connected to the digital device is connected with a camera and a notebook and the peripheral devices are not connected with any device, the prioritization part 108 increases the priority of the TV to provide the smooth Internet service to the devices connected to the TV.

The wireless LAN module 110 processes signals transmitted and received over a wireless LAN network under control of the controller 100. The wireless LAN module 110 transits to an active or inactive state under the control of the controller 100. The wireless LAN module 100 transmits the device information configured by the controller 100 to the counterpart digital device.

The user interface 120 includes an input part including at least one function key and a display part for displaying information generated in the operation of the digital device. The input part includes a keypad or a touch sensor, and provides data corresponding to user input to the controller 100. That is, the input part provides the controller 100 with data corresponding to the key pressed by the user or coordinates of a location corresponding to the user's touch. The display part displays various state information, numbers, characters, still images, and videos generating in the operations of the digital device under the control of the controller 100.

FIG. 2 is a diagram of a management flame that includes device information in the digital device according to an embodiment of the present disclosure.

As shown in FIG. 2, the management frame includes an element ID field 200, a length field 202, an Organizationally Unique Identifier (OUI) field 204, an OUI type field 206, and a device attributes field 208. The device attributes field 208 can contain a plurality of attribute information, and the attribute information includes an attribute ID field 210, a length field 212, and an attribute body field 214.

The element ID field 200 uses a value (e.g., '0xDD') defined by the standard for arbitrary use of providers. The length field 202 indicates the length of subsequent information, the OUI field 204 indicates an ID of the provider, and the GUI type field 206 indicates version information for the corresponding provider. Notably, the OUI field 204 can be expressed with four (4) bytes and the OUI type field 206 can be omitted according to the design. The device attributes field 208 contains the attribute information of the digital device.

Figure 3:
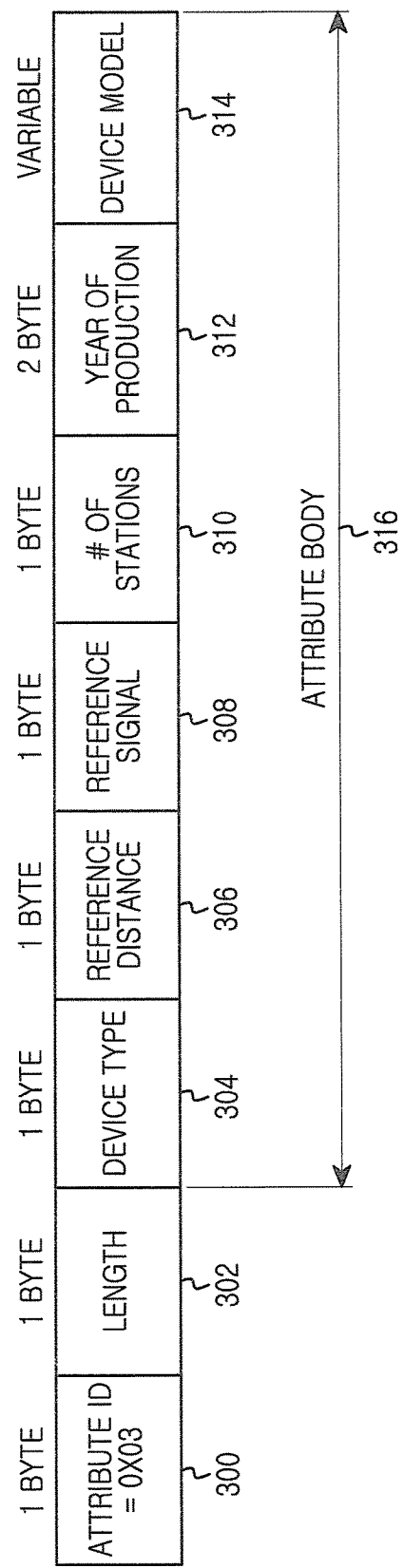
FIG. 3 illustrates a diagram of the device information generated in the digital device according to an embodiment of the present disclosure.

The device information in the device attributes 208 field is described in detail by referring to FIG. 3.

FIG. 3 depicts the device information generated in the digital device according to an embodiment of the present disclosure.

Referring to FIG. 3, the device information is contained in the device attributes field 208 of the management frame as stated above, and includes an attribute ID field 300, a length field 302, and an attribute body 316. The attribute body 316 includes a device type field 304, a reference distance field 306, a reference signal strength field 308, the number of connected devices 310, a year of production 312, and device model information 314.

The attribute ID field 300 informs that the information in the device attributes field 208 of the management frame is the device information, and uses a value (e.g., '0x03') defined for arbitrary use of the providers. The length field 302 indicates the length of subsequent information. The device type field 304 of the attribute body 316 indicates the type of the digital device corresponding to the device information using a pre-allocated unique value. The device type field 304 can indicate a TV using a value '0x00' and a mobile communication terminal using a value '0x01'.

The reference distance field 306 indicates a reference distance for determining the proximity of the peripheral device, and the reference signal strength field 308 indicates an average receive signal strength measured at the reference distance. The reference distance field 306 and the reference signal strength field 308 are used to determine whether the peripheral device approaches, which shall be explained in FIG. 10.

The number of the connected devices 310 indicates the number of the connected devices or the number of devices in the current data exchange when the digital device functions as an Access Point (AP). When the corresponding device is a peripheral device connected to the AP, the number of the connected devices field 310 has the value '0'. The year of production 312 indicates information relating to the production date of the digital device, and the device model information 314 indicates a model name or a model number of the digital device corresponding to the device information.

The device information including such information is delivered by the device attributes field 208 of the management frame to the peripheral device.

Figure 4:
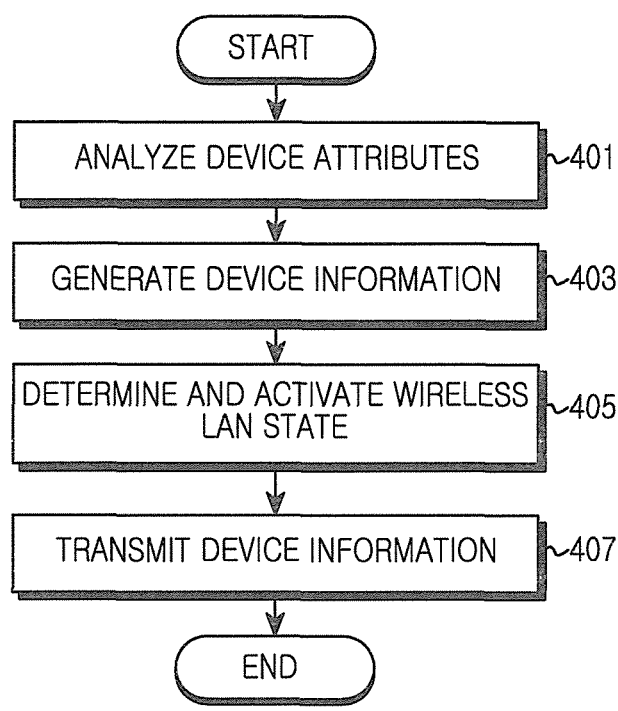
FIG. 4 illustrates a flowchart of a method for generating the device information in the digital device according to an embodiment of the present disclosure.

FIG. 4 is a flowchart of a method for generating the device information in the digital device according to an embodiment of the present disclosure.

Referring to FIG. 4, the digital device analyzes the device attributes in block 401. Herein, the digital device analyzes its attributes as described above. The attributes of the digital device indicate basic information of the device and information of the current communication state of the device, and include the device type, the number of the connected devices, the year of production, and the device model information.

In block 403, the digital device generates the device information including the attributes analyzed in block 401. As explained in FIGS. 2 and 3, the device information including the attribute ID 300, the length 302, and the attribute body 312 is contained in the device attributes 208 of the management frame.

In block 405, the digital device activates the wireless LAN module according to a user manipulation. That is, the user of the digital device can examine the active state of the wireless LAN module, and activate the wireless LAN module when the wireless LAN module is inactive.

In block 407, the digital device transmits the device information generated in block 403 to the peripheral device. The digital device can transmit the device information by including it to the management frame including the beacon frame, the probe request frame, and the probe response frame.

Next, the digital device finishes this process.

Figure 5:
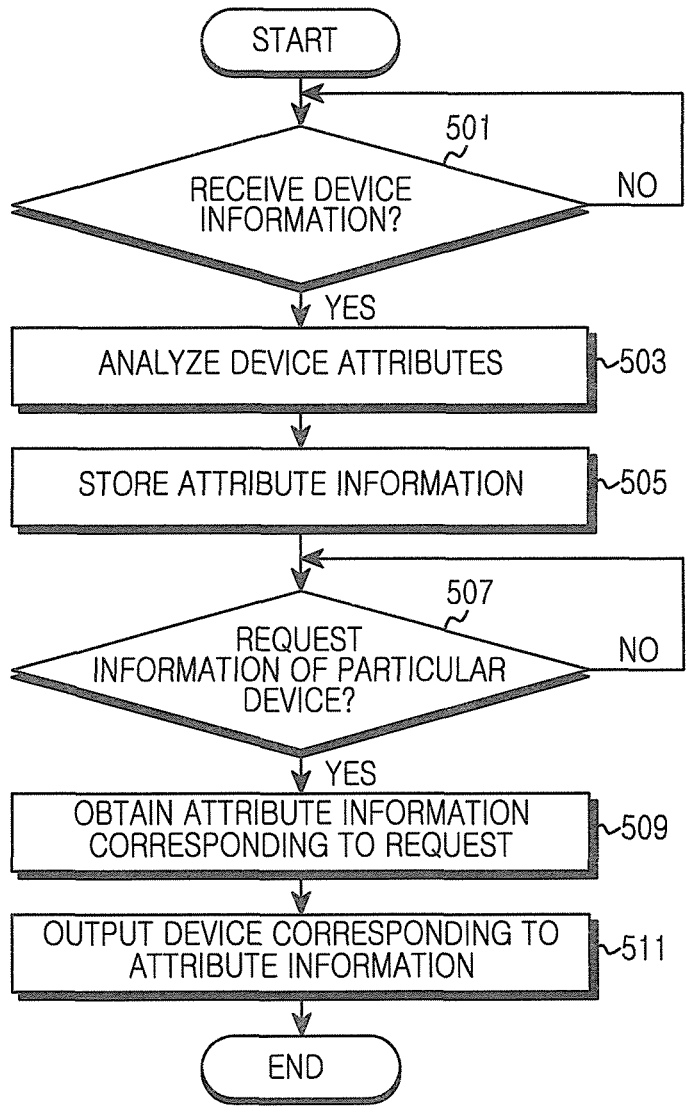
FIG. 5 illustrates a flowchart of a method for analyzing and processing the device information in the digital device according to an embodiment of the present disclosure.

FIG. 5 is a flowchart of a method for analyzing and processing the device information in the digital device according to an embodiment of the present disclosure.

Referring to FIG. 5, the digital device determines whether the device information including the attribute information of the digital device is received from the peripheral device in block 501.

To receive the device information, when the application program based on the wireless LAN initiates according to a user manipulation, the digital device examines the active state of the wireless LAN module. When the wireless LAN module is inactive, the digital device activates the wireless LAN module. Next, when receiving the probe response frame for the probe request frame or the management frame such as beacon frame from the peripheral device, the digital device determines whether the device information of the attribute information of the peripheral device is contained in the device attributes field. In so doing, when the beacon frame contains the element ID 200 of the value '0xDD', the digital device can determine that the beacon frame includes the device attribute information.

When not receiving the device information in block 501, the digital device repeats block 501.

Upon receiving the device information in block 501, the digital device analyzes the device information and acquires the information of the device type, the number of the connected devices, the year of production, and the device model by analyzing the attribute information of the digital device sending the device information in block 503, and processes to store the attribute information of block 503 in block 505. Using the attribute ID in the attribute information, the digital device can distinguish the attribute information corresponding to the respective devices.

In block 507, the digital device determines whether the user requests information of a particular device. Herein, the information request of the particular device requests information of particular devices corresponding to any one item of the attribute information.

When there is no information request of the particular device in block 507, the digital device repeats block 507.

Upon detecting the information request of the particular device in block 507, the digital device obtains the attribute information corresponding to the user's request by determining the pre-stored attribute information per device in block 509.

In block 511, the digital device outputs the device corresponding to the attribute information according to the user's request.

For example, when receiving the device information from the peripheral devices, the digital device obtains the type of the peripheral devices, the year of production, the device model name, and the number of the devices currently communicating with the device by analyzing the device information, and then stores the corresponding information.

When the user requests information of a Samsung Electronics product, the digital device, which can obtain the type, the year of production, and the device model name of the peripheral device, classifies only Samsung Electronics products (e.g., camera, notebook, TV, and the like) among the peripheral devices and provides them to the user. Also, according to the user's request, the digital device can classify only a product manufactured in a specific year and a product corresponding to a specific model name, and provide them to the user. Further, the digital device can provide a function supported by the particular device to the user.

Next, the digital device finishes this process.

Figure 6:
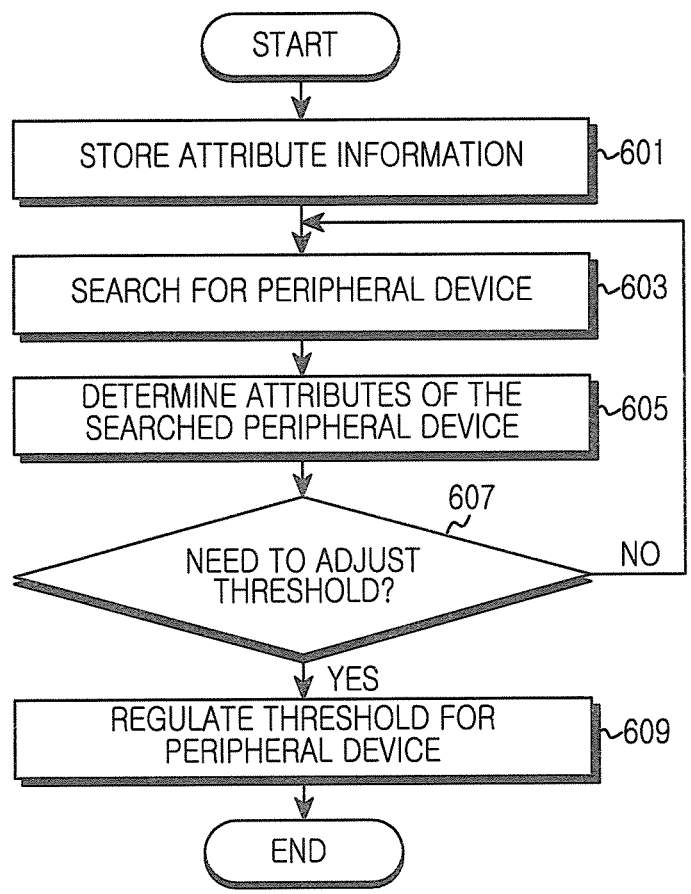
FIG. 6 is a flowchart of a method for changing a threshold used to recognize the peripheral device in the digital device according to an embodiment of the present disclosure.

FIG. 6 is a flowchart of a method for changing the threshold used to recognize the peripheral device in the digital device according to an embodiment of the present disclosure.

Referring to FIG. 6, the digital device changes the threshold used to determine whether another digital device is in proximity. When detecting the receive signal over the threshold, the threshold is changed to address inaccurate determination according to the characteristics of the peripheral device when the digital device determines that the counterpart digital device is in proximity. For example, when a peripheral device that includes an external antenna is weaker in transmit signal strength than a peripheral device that includes an embedded antenna and the same threshold is applied to the two peripheral devices, it may be difficult or impossible to determine the proximity of the peripheral device that includes the embedded antenna. Accordingly, the threshold for the peripheral device that includes the embedded antenna is changed.

To change the threshold, the digital device obtains the attribute information by analyzing the device information received from the peripheral device, and then processes to store the obtained attribute information in block 601. This block is explained earlier in FIG. 5 and not further described here.

After searching for the peripheral device in block 603, the digital device determines the attribute information for the searched peripheral device in block 605.

In block 607, the digital device determines whether the peripheral device for the threshold change is searched. The digital device determines whether there is a device having a weak transmit signal strength, such as a device that includes the embedded device, in proximity.

When not detecting the peripheral device for the threshold change in block 607, the digital device repeats block 603.

Upon detecting the peripheral device for the threshold change in block 607, the digital device processes to decrease or increase the threshold for the peripheral device in block 609.

Next, the digital device finishes this process.

Figure 7:
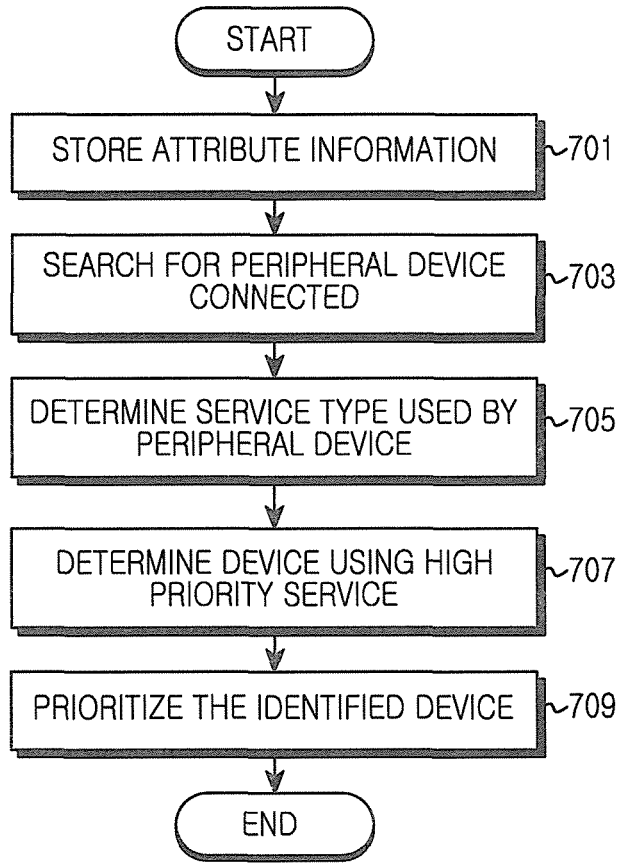
FIG. 7 illustrates a flowchart of a method for prioritizing the peripheral device in the digital device according to an embodiment of the present disclosure.

FIG. 7 is a flowchart of a method for prioritizing the peripheral device in the digital device according to an embodiment of the present disclosure.

Referring to FIG. 7, the digital device changes the priority of the plurality of the devices communicating with the digital device to provide a differentiated service to each peripheral device. For example, when communicating with the peripheral devices using the voice service, the video service, and the best effort service, the prioritization part prioritizes the peripheral device using the voice service of high priority based on the device information, regulates the CW and the AIFS, and thus provides the smooth service for the particular device.

To do so, after obtaining the attribute information by analyzing the device information received from the peripheral device, the digital device processes to store the obtained attribute information in block 701, which is explained earlier in FIG. 5 and thus shall not be further described.

After searching for the connected peripheral device in block 703, the digital device determines the type of the service used by the peripheral device in step 705.

In step 707, the digital device determines the device of the high priority service. In step 709, the digital device prioritizes the peripheral device by arranging the devices in a descending order of priority using the result of step 707 so as to provide the smooth service of the prioritized peripheral device.

Next, the digital device finishes this process.

Figure 8:
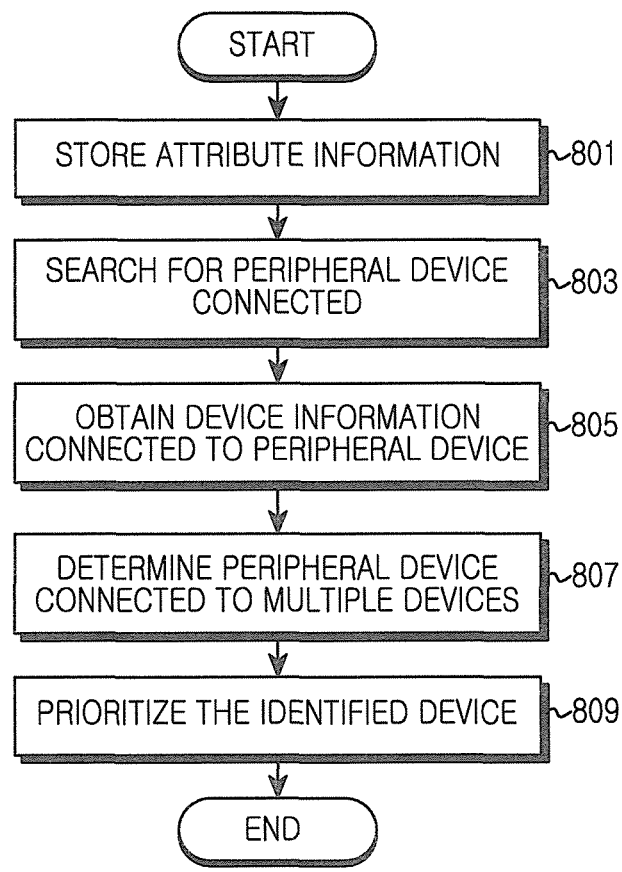
FIG. 8 illustrates a flowchart of a method for prioritizing the peripheral device in the digital device according to another embodiment of the present disclosure.

FIG. 8 is a flowchart of a method for prioritizing the peripheral device in the digital device according to another embodiment of the present disclosure.

Referring to FIG. 8, the digital device can prioritize the peripheral device communicating with the plurality of the devices by determining the number of the communicating devices per peripheral device using the device information. For example, when the TV connected to the digital device is connected with the camera and the notebook and the peripheral devices are not connected with other devices, the digital device increases the priority of the TV so that the devices connected to the TV can offer smooth Internet service.

After obtaining the attribute information by analyzing the device information received from the peripheral device, the digital device processes to store the obtained attribute information in step 801, which has been described in FIG. 5 and thus shall not be further explained.

The digital device searches for the connected peripheral device in step 803, and then obtains the information of the peripheral device communicating with the peripheral device in block 805. That is, in block 805, the digital device determines whether its connected peripheral device is connected with another peripheral device.

Next, the digital device determines the device connected to the plurality of the peripheral devices among its connected peripheral devices in block 807, and then prioritizes the determined peripheral device so that the devices connected to the prioritized peripheral device can provide smooth service in block 809.

Next, the digital device finishes this process.

Figure 9:
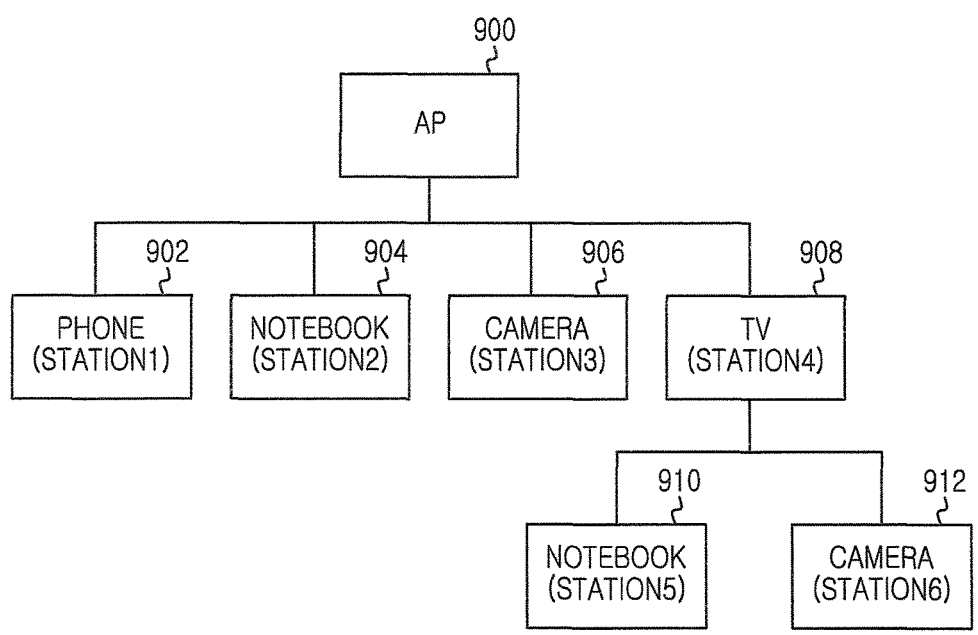
FIG. 9 illustrates a diagram of the prioritization of the peripheral device in the digital device according to another embodiment of the present disclosure.

FIG. 9 depicts the prioritization of the peripheral device in the digital device according to another embodiment of the present disclosure.

Referring to FIG. 9, the digital device functions as the AP 900, and is connected with a mobile communication terminal 902, a notebook 904, a camera 906, and a device 908 corresponding to the TV. The TV 908 is connected to another notebook 910 and a camera 912.

The digital device 900 can determine the services used by the devices 902-912 by receiving the device information from the devices 902-912.

That is, the digital device 900 can confirm that the portable terminal 902 uses the voice service, the notebooks 904, 910 use the video service, the cameras 906, 912 use an image transfer service, and the TV 908 uses the wireless Internet service.

The digital device 900 gives the priority to the portable terminal 902 using the high priority service to thus offer smooth voice service.

In addition, the digital device 900 can obtain the number of the devices connected to each device by receiving the device information from the devices.

In detail, the digital device 900 can confirm that the portable terminal 902, the notebook 904, and the camera 906 are not connected with other devices, and that the TV 908 is connected with another notebook 910 and the camera 912.

The digital device 900 can provide an environment for smooth services of the TV 908, another notebook 910, and the camera 912 by prioritizing the TV 908 connected to the multiple devices.

Figure 10:
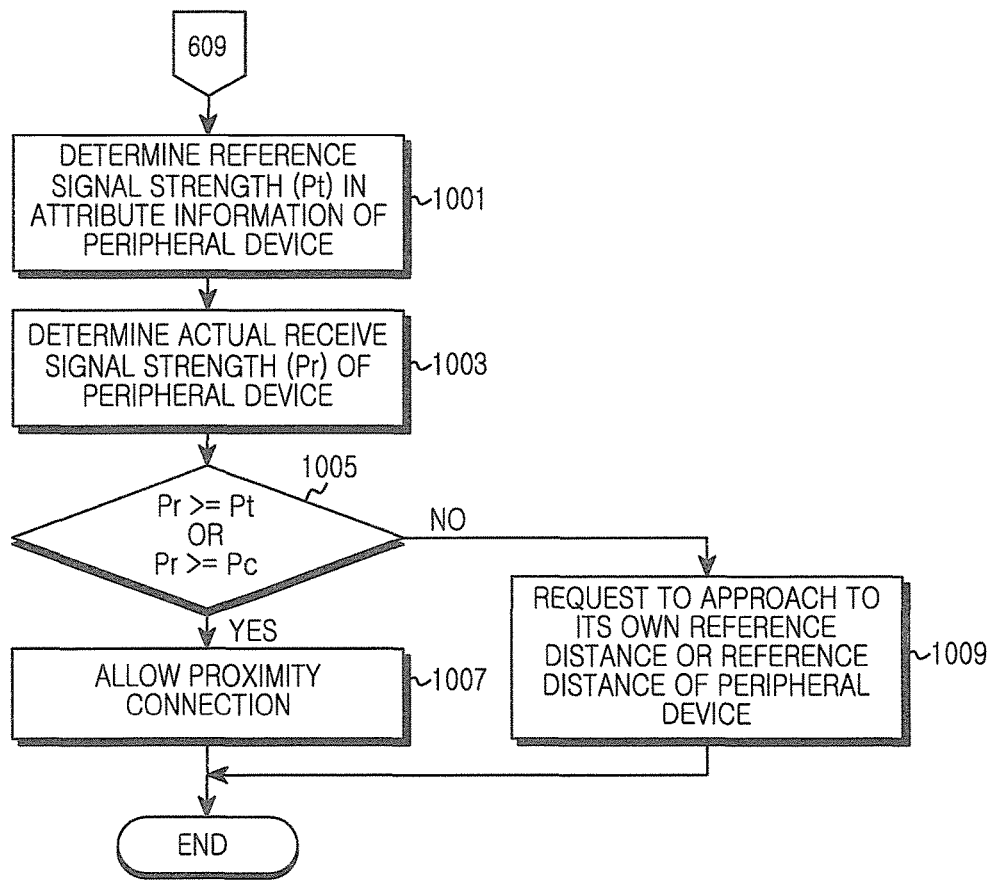
FIG. 10 illustrates a flowchart of a method for changing the threshold used to recognize the peripheral device in the digital device according to an embodiment of the present disclosure.

FIG. 10 is a flowchart of a method for changing the threshold used to recognize the peripheral device in the digital device according to an embodiment of the present disclosure.

Referring to FIG. 10 and block 609 in FIG. 6, the digital device determines the reference signal strength in the attribute information of the peripheral device in block 1001 and then determines the actual receive signal strength of the peripheral device in block 1003. In block 1001, an average receive signal strength measured at the reference distance is determined to determine the proximity of the peripheral device.

In block 1005, the digital device determines to allow the connection to the peripheral device.

Block 1005 corresponds to a situation when the actual receive signal strength of the peripheral device is greater than the reference signal strength or when the actual receive signal strength is greater than a minimum receive signal strength allowing the connection to the peripheral device.

Upon a determination to allow the connection to the peripheral device in block 1005, the digital device allows the connection to the peripheral device in block 1007.

Upon a determination to not allow the connection to the peripheral device in block 1005, the digital device moves to a location for the proximity connection of the peripheral device in block 1009.

In so doing, the digital device moves close to the peripheral device by sending to the user a message requesting to move to its reference distance or the reference distance of the peripheral device.

For instance, the digital device determines the reference distance Dt and the reference signal strength Pt in the attribute information of the peripheral device, and stores Dt and Pt. Next, the digital device measures the actual receive signal strength Pr for the peripheral device, and stores Pr.

The digital device defines the reference distance and the reference signal strength of its attribute information as Ds and Ps, defines the minimum receive signal strength allowing the proximity connection as Pc, and then performs the proximity connection according to the following determination.

When the actual receive signal strength can recognize the proximity of the peripheral device ((Pr>=Pt)||(Pr>=Pc)), the digital device allows the proximity connection to the peripheral device. When the actual receive signal strength cannot recognize the proximity of the peripheral device, the digital device shows a message instructing to move close to the proximity connection target to the user of the digital device and does not perform the proximity connection. The digital device allows the proximity connection to the peripheral device when the actual receive signal strength Pr of the peripheral device is greater than the reference signal strength Pt of the peripheral device or when the actual receive signal strength Pr of the peripheral device is greater than the minimum receive signal strength Pc allowing the proximity connection ((Pr>=Pt)||(Pr>=Pc)). The digital device can permit the proximity connection to the peripheral device when the actual receive signal strength Pr of the peripheral device is greater than the reference signal strength Pt of the peripheral device and the actual receive signal strength Pr of the peripheral device is greater than the minimum receive signal strength Pc allowing the proximity connection ((Pr>=Pt) && (Pr>=Pc)).

Next, the digital device finishes this process.

As set forth above, the attributes of the peripheral device are acquired by analyzing the device information of the peripheral device. The present method includes generating and sending to the peripheral device the device information including the attribute information by analyzing the attributes, and obtaining the attribute information of the device corresponding to the received device information when the device information of the peripheral device is received. Thus, it is possible to classify a particular peripheral device according to the user's request and to prioritize the particular peripheral device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An apparatus in a digital device to connect to a wireless network, the apparatus comprising:
    a communication unit configured to receive device information from at least one peripheral device, wherein the device information comprises information about attributes of each of the at least one peripheral devices; and
a controller configured to:
determine a threshold used to determine a proximity of the peripheral device using the received device information,
measure a receive signal strength of the peripheral device,
control the communication unit to establish a connection with the peripheral device if the measured receive signal strength is greater than the threshold, and
output information requesting to move close to the peripheral device if the measured receive signal strength is less than or equal to the threshold.

2. The apparatus of claim 1, wherein the controller is configured to generate digital device information associated with the digital device and control a transmission of the generated digital device information to the at least one peripheral device, and wherein the generated digital device information is used to determine information about attributes of the digital device by the at least one peripheral device.

3. The apparatus of claim 2, wherein the controller is configured to transmit the digital device information to the at least one peripheral device by adding the digital device information to a management frame.

4. The apparatus of claim 1, wherein the controller is configured to adjust the threshold using the received device information.

5. The apparatus of claim 1, wherein the controller is configured to connect to the at least one peripheral device by prioritizing a peripheral device according to a priority of a service provided by the peripheral device using analyzed device information.

6. The apparatus of claim 5, wherein the controller is configured to connect to the at least one peripheral device by prioritizing the peripheral device as a function of a number of devices connected to the peripheral device using the analyzed device information.

7. The apparatus of claim 1, wherein the device information comprises at least one of a device type, a reference distance, a reference signal strength, a number of connected devices, a year of production, or device model information.

8. The apparatus of claim 1, wherein the controller is configured to output information requesting to move close to the peripheral device by displaying, to a user, a message requesting to move to a reference distance of the digital device.

9. The apparatus of claim 1, wherein the controller is configured to filter a list of peripheral devices available for connection based on a user input selection.

10. The apparatus of claim 1, wherein controller is configured to obtain attribute information of the digital device, store the obtained attribute information, and provide information for the request using pre-stored attribute information after detecting an information request for a particular device.

11. A method used by a digital device to connect to a wireless network, the method comprising:
receiving device information from at least one peripheral device, wherein the device information comprises information about attributes of each of the at least one peripheral devices; and
determining a threshold used to determine a proximity of the peripheral device using the received device information,
measuring a receive signal strength of the peripheral device,
controlling a communication unit to establish a connection with the peripheral device if the measured receive signal strength is greater than the threshold, and
outputting information requesting to move close to the peripheral device if the measured receive signal strength is less than or equal to the threshold.

12. The method of claim 11, further comprising:
generating digital device information associated with the digital device; and
controlling a transmission of the generated digital device information to the at least one peripheral device, wherein the generated digital device information is used to determine information about attributes of the digital device by the at least one peripheral device.

13. The method of claim 12, wherein transmitting the digital device information to the peripheral device comprises:
adding the digital device information to a management frame.

14. The method of claim 11, further comprising:
adjusting the threshold using the received device information.

15. The method of claim 11, wherein establishing a connection with the peripheral device comprises:
connecting to the at least one peripheral device by prioritizing a peripheral device according to a priority of a service provided by the peripheral device using analyzed device information.

16. The method of claim 15, wherein establishing a connection with the peripheral device comprises:
connecting to the at least one peripheral device by prioritizing the peripheral device as a function of a number of devices connected to the peripheral device using the analyzed device information.

17. The method of claim 11, wherein the device information comprises at least one of a device type, a reference distance, a reference signal strength, a number of connected devices, a year of production, or device model information.

18. The method of claim 11, wherein outputting information requesting to move close to the peripheral device comprises:
displaying, to a user, a message requesting to move to a reference distance of the digital device.

19. The method of claim 11, further comprising:
filtering a list of peripheral devices available for connection based on a user input selection.

20. The method of claim 11, further comprising:
after obtaining attribute information of the device, storing the obtained attribute information; and
after detecting an information request for a particular device, providing information for the request using pre-stored attribute information.

* * * * *